(12) United States Patent
Avery

(10) Patent No.: US 7,334,593 B2
(45) Date of Patent: Feb. 26, 2008

(54) UMBRELLA SUPPORT DEVICE AND SERVING TRAYS

(76) Inventor: Bryan K. Avery, 3191 Harnett Central Rd., Angier, NC (US) 27510

( * ) Notice: Subject to any disclaimer, the term of this patent is extended or adjusted under 35 U.S.C. 154(b) by 497 days.

(21) Appl. No.: 10/992,887

(22) Filed: Nov. 19, 2004

(65) Prior Publication Data

US 2006/0107984 A1    May 25, 2006

(51) Int. Cl.
*E04H 15/06* (2006.01)
*A45B 3/00* (2006.01)

(52) U.S. Cl. .................. 135/88.08; 135/16; 135/98; 248/541; 248/229.1; 296/163; 108/50.12

(58) Field of Classification Search ............ 135/88.05, 135/88.07, 88.08, 88.13, 16, 96, 98; 108/16, 108/25, 29, 44, 50.12; 126/25 A, 25 AA; 296/26, 30, 193.12, 187.13, 57.1, 37.6, 163; 248/229.1, 214, 229.16, 156, 540–541, 539; 43/15, 21.2

See application file for complete search history.

(56) References Cited

U.S. PATENT DOCUMENTS

| 2,805,109 | A | * | 9/1957 | Kopmar ..................... 108/25 |
| 2,940,439 | A | * | 6/1960 | Bartels et al. ................ 126/30 |
| 3,295,473 | A | * | 1/1967 | Wentworth ................. 108/152 |
| 3,877,622 | A | * | 4/1975 | McLain ...................... 224/497 |
| 4,403,716 | A | * | 9/1983 | Carlson et al. .............. 224/485 |
| 4,719,898 | A | * | 1/1988 | Stanislawski ............... 126/9 R |
| 5,232,133 | A |   | 8/1993 | Speer |
| 5,855,286 | A | * | 1/1999 | Zaid ........................ 211/87.01 |
| 5,857,741 | A |   | 1/1999 | Anderson |
| 5,878,762 | A | * | 3/1999 | Huang ......................... 135/16 |
| 5,950,617 | A |   | 9/1999 | Lorenz |
| 6,070,571 | A | * | 6/2000 | Bradbury ..................... 126/30 |
| 6,082,269 | A | * | 7/2000 | Padberg ....................... 108/44 |
| 6,189,458 | B1 | * | 2/2001 | Rivera ......................... 108/44 |
| 6,232,928 | B1 | * | 5/2001 | Zimmerman et al. ....... 343/882 |
| 6,314,891 | B1 |   | 11/2001 | Larson |
| 6,357,710 | B1 |   | 3/2002 | Fielden et al. |
| 6,375,146 | B1 | * | 4/2002 | Painchaud .................. 248/534 |
| 6,443,172 | B2 | * | 9/2002 | Brumfield .................... 135/16 |
| 6,676,094 | B1 | * | 1/2004 | Brown ........................ 248/214 |
| 2003/0038218 | A1 | * | 2/2003 | Eppard et al. ........... 248/219.4 |

* cited by examiner

*Primary Examiner*—Winnie Yip
(74) *Attorney, Agent, or Firm*—Robert R. Reed

(57) ABSTRACT

The present invention provides a support device associated with an object such as a vehicle tailgate or a residential deck for holding an umbrella with an umbrella pole supporting at least one serving tray to provide shade from the sun for a user occupying a portion of the object. The support device comprises a bent plate support in contact with the object. At least one retainer strap with a hook at each end holds the bent plate in contact with the object. An umbrella pole support is connected to the bent plate support to receive and help hold the umbrella pole. At least one support collar is welded to the bent plate to receive and support the umbrella pole support. Additional accessories and applications are also realized within the scope of this invention including a fishing pole holder, a bowl holder and a light assembly for night use.

18 Claims, 8 Drawing Sheets

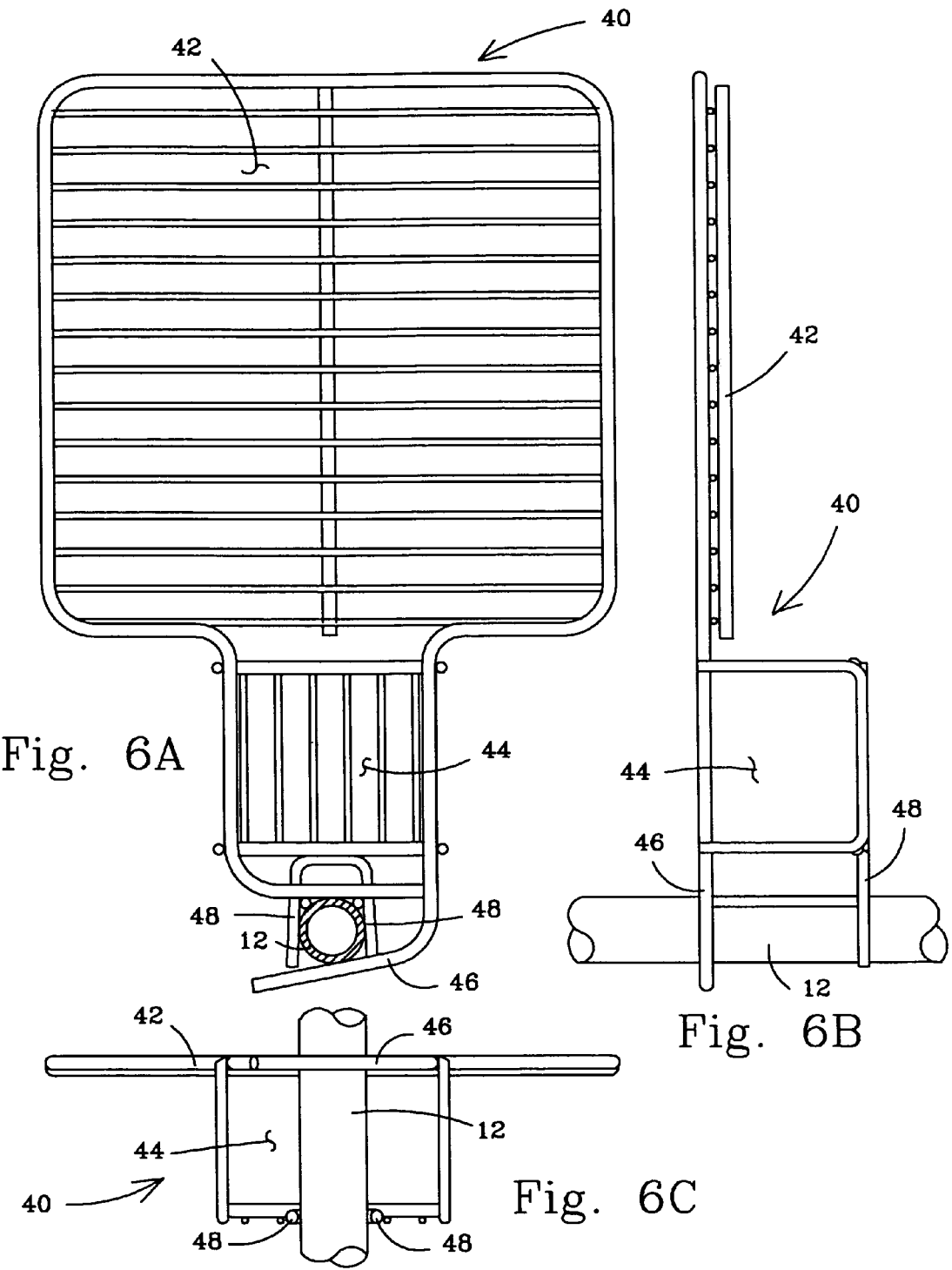

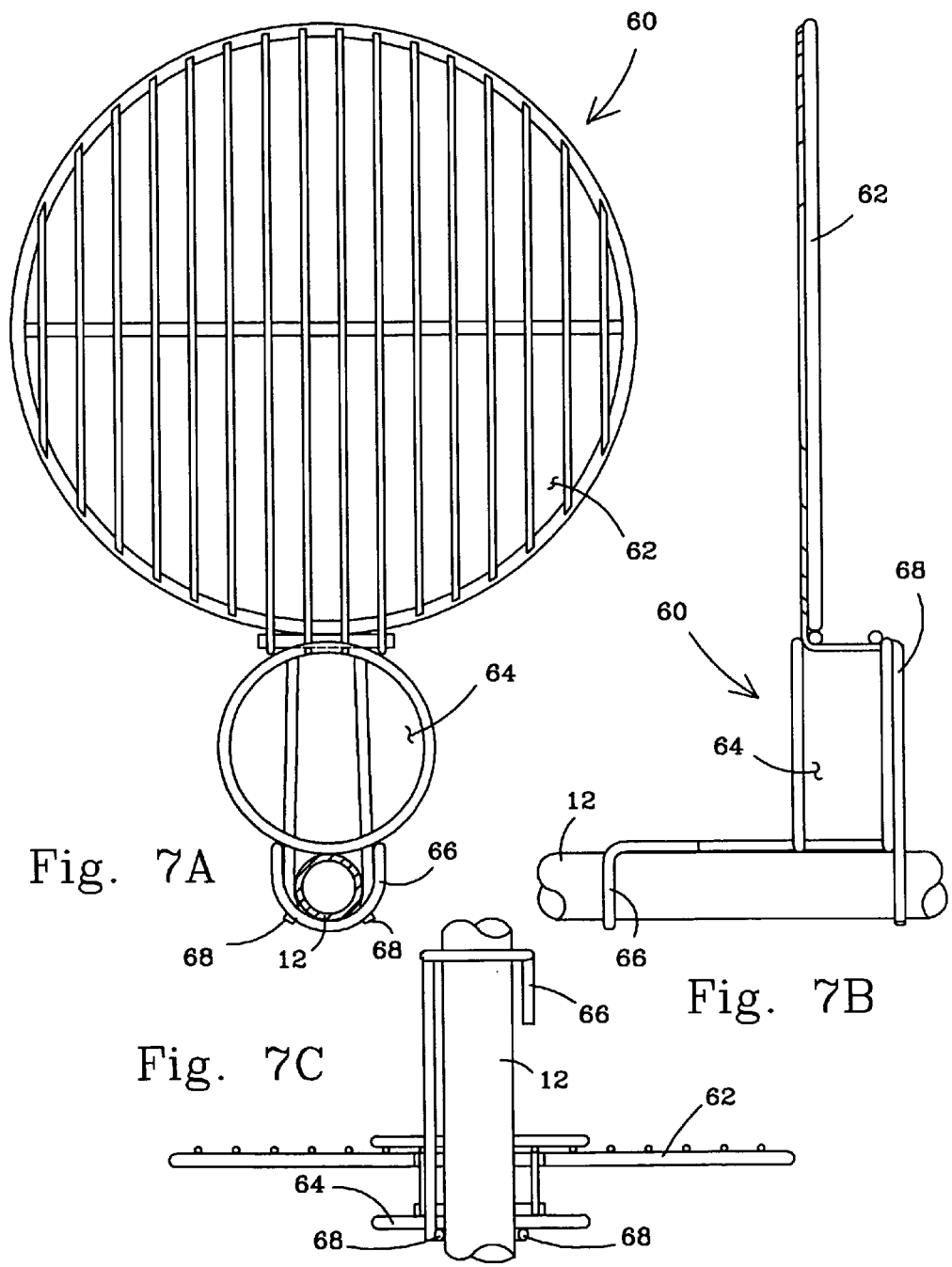

UMBRELLA SUPPORT DEVICE AND SERVING TRAYS

BACKGROUND OF THE INVENTION

This invention is directed to providing shade from the direct rays of the sun and more particularly to providing a support device and umbrella for tailgating or for a wooden deck or patio and the like. The support device further holds the umbrella pole vertically for installing serving trays on the umbrella pole for eating and drinking in the shade of the umbrella.

Tailgating is a popular activity prior to and after a sporting activity, such as a football game. The family and friends arrive in their vehicle prior to the game to avoid heavy traffic near the game site. A good parking space is found near the game site and the food is prepared and consumed using the family vehicle as a base for eating and drinking the prepared food. Most times the parking space is not protected from the sun by shade trees or other structures and the family and friends need to provide their own sun shade means. A sun shade structure can be in the form of an open tent structure or lean-to and is generally erected at the rear or tail end of the vehicle. Many vehicles such as a sport utility vehicle, a mini van or a pickup and the like have a tail gate which is opened or lowered to assist the tailgating activity and the support of the sun shade. Generally speaking, there is no device for supporting a conventional umbrella at the rear end of a vehicle. Most families have an umbrella to use in providing protection from the sun. A need exists for being able to support an umbrella at the rear end of a vehicle to eliminate the need to purchase an additional sun shade structure for tailgating.

Serving the prepared food while tailgating requires a plate for holding the food and a tray or table for supporting the plate. A seat or folding chair is generally provided for family and friends to sit while they eat. A need exists for using a sun shade structure which can help support the plate and provide a seat without purchasing and transporting additional tables and chairs.

Conventional sun shade screens and supporting structure found in the industry for tailgating with vehicles are disclosed in U.S. Pat. Nos. 5,232,133; 5,857,741; 5,950,617; 6,314,891; and 6,357,710. The umbrella supports of '741 and '617 use the hitch receiver of the vehicle to support the umbrella.

The use of an umbrella on the deck of a private residence for a sun screen structure is generally associated with conventional picnic or umbrella table having a center hole and lower support structure to support the umbrella pole vertically. The table also provides a conventional support for plates and the like when serving food or reading. A need exists for being able to support the umbrella from the deck structure alone to eliminate the expense of the table. The conventional handrail of the deck is available to help support the umbrella pole and serving trays can be supported from the umbrella pole to carry plates and the like. Typical umbrella supports from a picnic table are also disclosed in U.S. Pat. Nos. 5,232,133 and 6,314,891.

A need exists to support a conventional umbrella and umbrella pole from the rear tailgate of a vehicle using a support device to provide a sun screen structure when tailgating at a sporting event or a concert. Serving trays can also be supported from the umbrella pole to eliminate the need of separate tables. The support device needs to support the umbrella pole with serving trays so the tailgate of the vehicle can be used as a seat to support someone using the serving trays without the need for additional chairs. The support device also needs to provide alternate usage for an umbrella and umbrella pole supported from the handrail of a conventional deck. The addition of serving trays further eliminates the need for an umbrella table.

Accordingly, an object of the present invention is to provide a support device that allows an umbrella with an umbrella pole to provide a sun screen structure when supported vertically at the rear end of a vehicle using a tail gate of the vehicle.

Another object of the present invention is to provide serving trays supported by the umbrella pole to eliminate the need for a separate table when eating or drinking under the umbrella.

Yet another object of the present invention is to locate the umbrella at the rear end of the vehicle so that the tail gate of the vehicle can be used as a seat when the serving trays are being used.

A further object of the present invention is to provide the support device that also allows the umbrella and umbrella pole to be supported from the handrail of a deck or similar structure.

SUMMARY OF THE INVENTION

The above objectives are accomplished according to the present invention by providing a combination sun screen and serving assembly. The invention is used to provide shade protection from the sun as well as protection from the weather by providing an umbrella supported by an umbrella pole held in place by attaching it to an object. The particular applications of interest in this invention are associated with sporting events, or using the umbrella for periods of relaxation on the deck of a residence. Sporting events include football games and fishing where the user makes use of his or her vehicle to travel to the event and for periods of other activities, such as resting and eating. Support for the umbrella pole is provided by a support device connected to an available object or, in this case, the vehicle. Preferably the tailgate is lowered for access to the vehicle from the outside and to provide a place to sit. The tailgate provides a convenient object for connecting the support device to the vehicle so that the umbrella is thereby located to provide protection for someone sitting on the tailgate. The umbrella pole serves a dual purpose in this invention by helping support serving trays to serve the needs of the user. Serving trays, as provided in this invention, are designed to be supported by the umbrella pole. This makes it unnecessary to provide either a chair or a table for the user.

The same support device used with a vehicle can be used on the deck of a residence. The support device can be attached to and supported by one of the rails of the deck handrail. The same serving trays are again supported from the umbrella pole. Again, this invention helps eliminate the need on a deck for a picnic table or other means for serving food or providing other table functions, such as a magazine rack.

The invention provides a combination sun screen and serving assembly for a user. The invention comprises a combination umbrella supported by an umbrella pole. A support device is attached to an object for holding the umbrella pole in a generally vertical position to shade at least a portion of the object and the user from the sun. At least one serving tray is held and supported by the umbrella pole to serve the needs of the user in the shade of the umbrella.

In one embodiment of the invention the object is a vehicle having a tailgate and the support device includes a bent plate supported in contact with the tailgate. At least one retainer strap with a hook at each end holds the bent plate in contact with the tailgate. An umbrella pole support is connected to the bent plate support to receive and help hold the umbrella pole. The bent plate includes an end portion made integral with both a main contact portion and a bottom portion. A first retainer portion is made integral with the main contact portion and a second retainer is made integral with the bottom portion. Each retainer portion has an aperture to receive a respective hook of the retainer strap.

In another embodiment of the invention the object is a residential deck having a top rail and the support device includes a bent plate supported in contact with the top rail. At least one retainer strap with a hook at each end holds the bent plate in contact with the top rail. An umbrella pole support is connected to the bent plate support to receive and help hold the umbrella pole on the residential deck.

The invention further provides a support device associated with an object for holding an umbrella with an umbrella pole supporting at least one serving tray to provide shade from the sun for a user occupying a portion of the object and using the serving tray. The support device comprises a bent plate support in contact with the object. At least one retainer strap with a hook at each end holds the bent plate in contact with the object. An umbrella pole support is connected to the bent plate support to receive and help hold the umbrella pole. At least one support collar is welded to the bent plate to receive and support the umbrella pole support.

Additional accessories and applications are also realized within the scope of this invention. Accessories include a fishing pole holder and a bowl holder that are attached to one of the support collars of the support device. In addition a light assembly is added to the umbrella pole for at night time illumination of the object area.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 6A is a plan view of a rectangular serving tray of this invention having a food tray and a drink holder as well as a first support arm and a second support arm for supporting the serving tray from the umbrella pole;

FIG. 6B is a side elevation view of the rectangular serving tray of FIG. 6A;

FIG. 6C is a front elevation view of the rectangular serving tray of FIG. 6A;

FIG. 7A is a plan view of a circular serving tray of this invention having a food tray and a drink holder as well as an upper support arm and a pair of lower support arms for supporting the serving tray from the umbrella pole;

FIG. 7B is a side elevation view of the serving tray of FIG. 7A;

FIG. 7C is a front elevation view of the serving tray of FIG. 7A;

DESCRIPTION OF A PREFERRED EMBODIMENT

Figure 1:
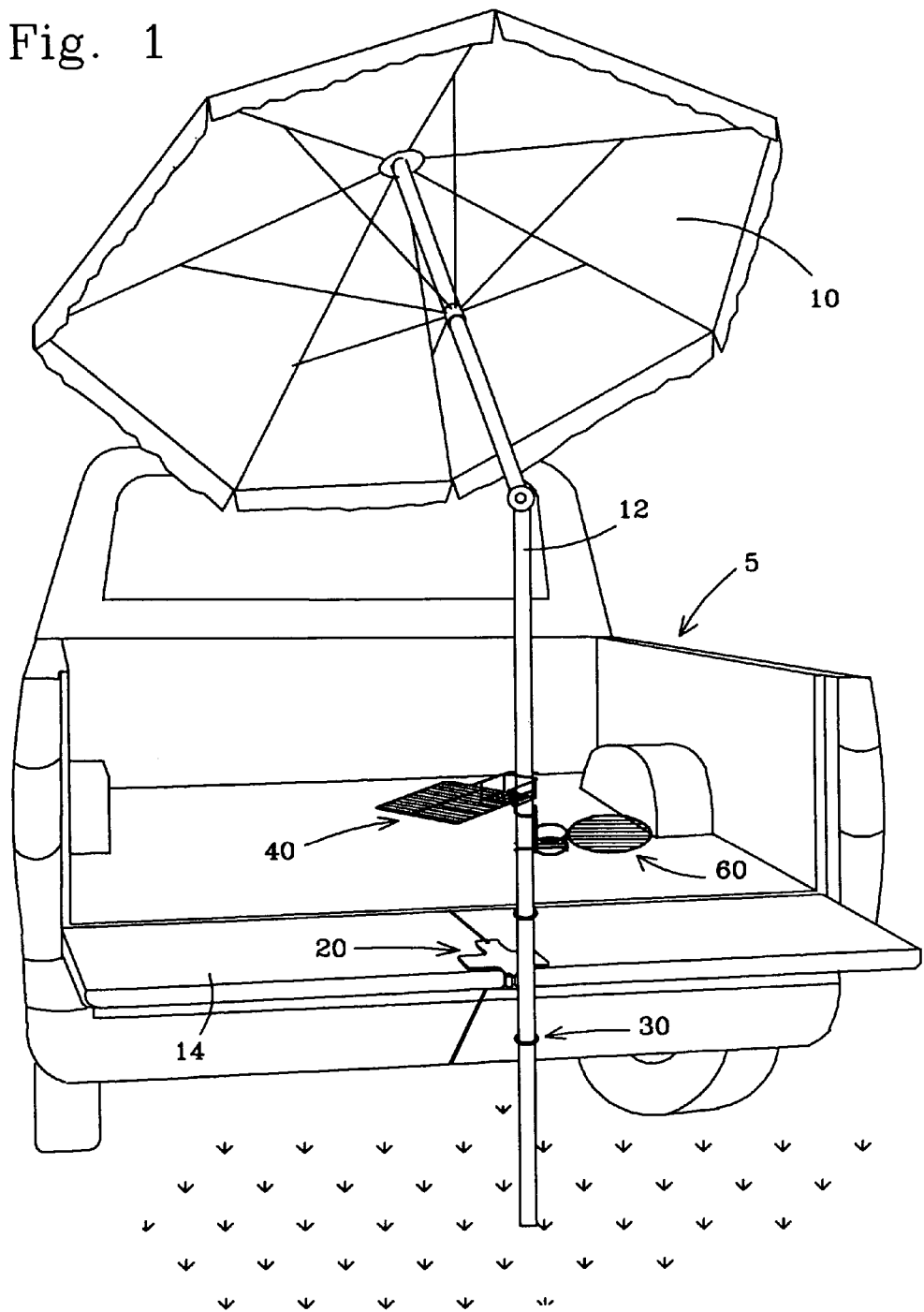
FIG. 1 is a perspective view of a conventional umbrella and umbrella pole being supported by a support device from a tail gate of a vehicle for providing a sun screen structure with serving trays for tailgating.

Referring now in more detail to the drawings, the invention will now be described in more detail. A first embodiment of a combination screen and serving assembly of this invention is illustrated in FIG. 1. The screen is a sun screen provided by an umbrella 10 supported from an articulated umbrella pole 12 by an object. The umbrella can be used to provide protection from the sun (sun screen) as well as protection from the weather. In the illustration of FIG. 1, the object is a vehicle 5 and the umbrella is supported at the rear of the vehicle with the umbrella pole sitting on the ground. A pickup with a tailgate 14 is used as the vehicle in the illustration. The tailgate provides a seat for the user to sit while resting or eating. Other type vehicles with tailgates including sport utility vehicles, mini vans and station wagons can also be provided with the sun screen and serving assembly of this invention. The umbrella pole is supported by a support device 20 attached to the tailgate of the vehicle.

The serving assembly of this invention is provided by using umbrella pole 12 to support and hold at least one serving tray. The illustration of FIG. 1 shows both a rectangular serving tray 40 and a circular serving tray 60 being provided. The serving tray allows the user to have a horizontal surface to use for eating or placing papers and other articles at a convenient location. When used with the tailgate of a vehicle, as in FIG. 1, the user can sit on the tailgate and have a place to support food and beverages, as with a table. Details of the rectangular and circular serving trays are illustrated in FIGS. 6 and 7 and are discussed in detail in the following sections.

Figure 2:
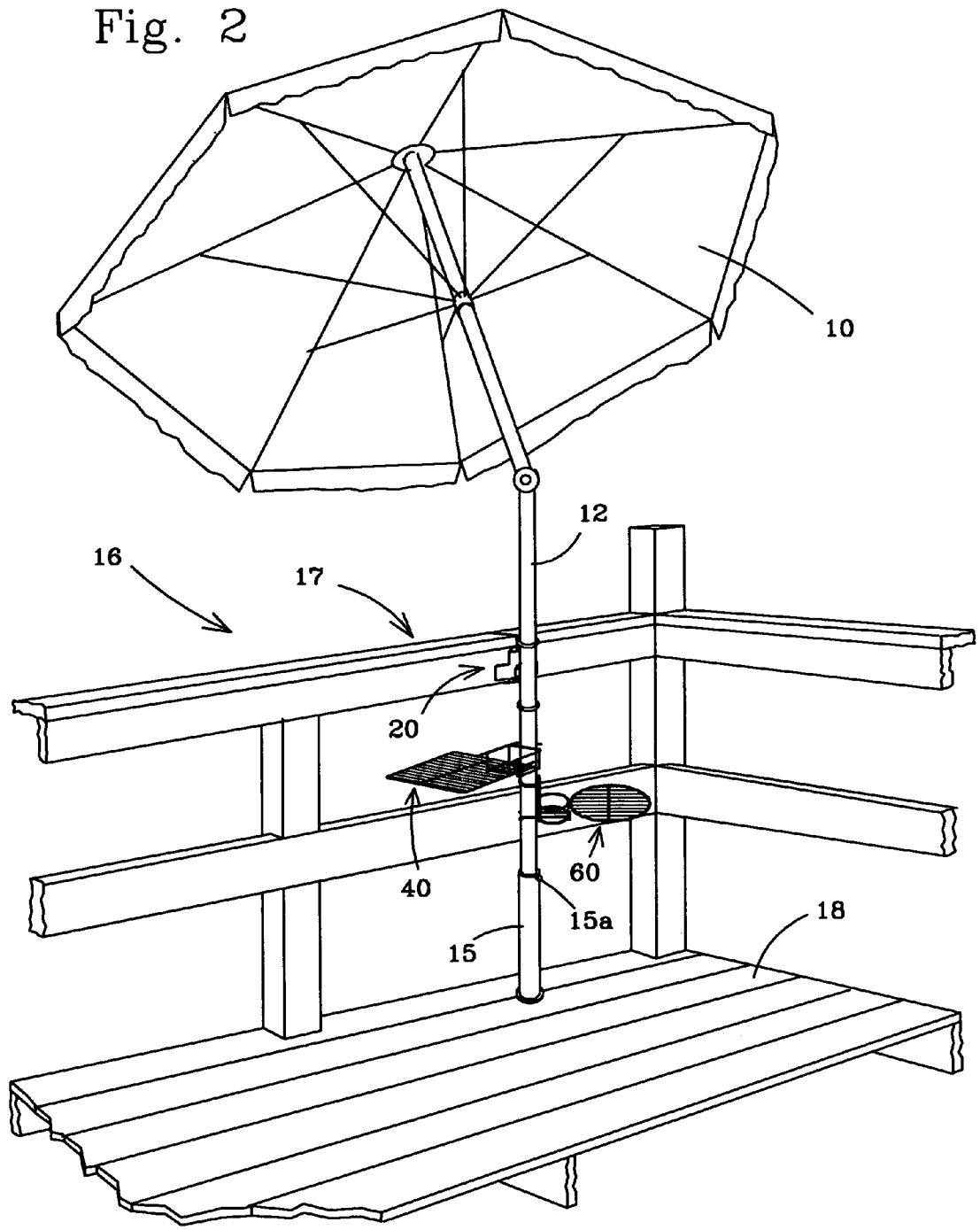
FIG. 2 is a perspective view of an umbrella and umbrella pole being supported by the support device from a top rail of a deck for providing a sun screen structure with serving trays for a conventional deck.

A second embodiment of the combination screen and serving assembly of this invention is illustrated in FIG. 2. In the second embodiment, umbrella 10 is supported by umbrella pole 12 deployed on a deck 16 of a residence. The object supporting the umbrella and umbrella pole is the deck having a top rail 17. The same support device 20 as used with the tailgate of a vehicle is connected to the top rail of the deck. The umbrella pole is placed in a sleeve 5 that rests on a deck floor 18. The sleeve provides an adjustment in the height of the umbrella above the deck floor. A set screw 15a holds the umbrella pole at a desired height as it telescopes up or down. Alternately, a telescoping umbrella pole can be used within the scope of this invention. The same serving trays 40 and 60 are used in this application. The serving trays replace the need of a table. This is an effective means to provide refreshments and shade or shelter during a party when using the deck to provide added space and serving tables for party members exterior to the residence.

Figure 3A:
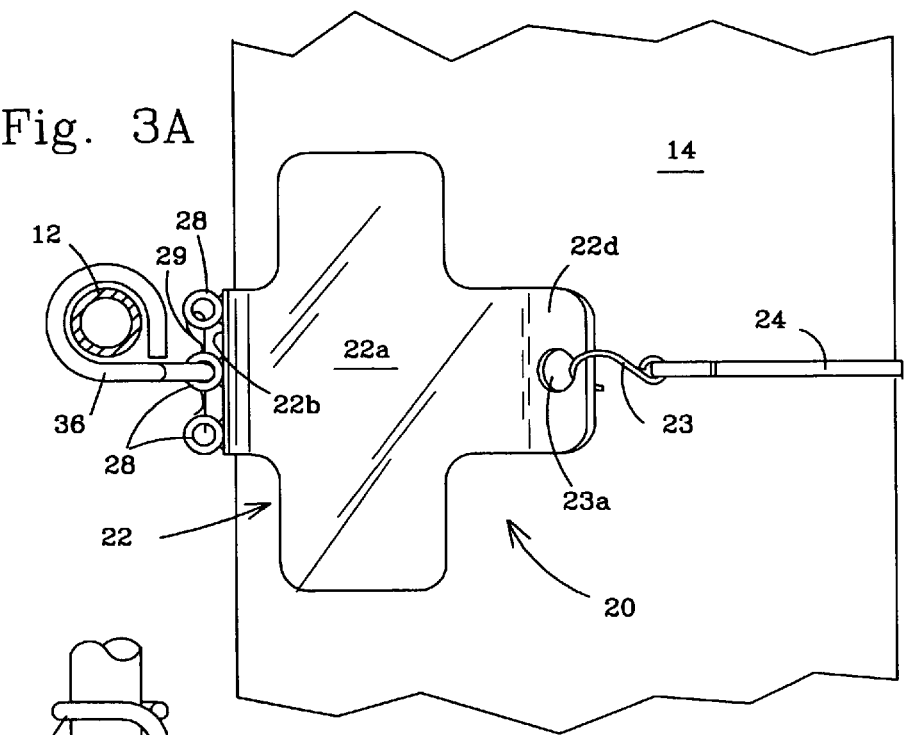
FIG. 3A is a plan view of a support device attached to the tail gate of a vehicle having a bent plate support, support collars, an umbrella pole support connected to the support collars and a retainer strap.
Figure 3B:
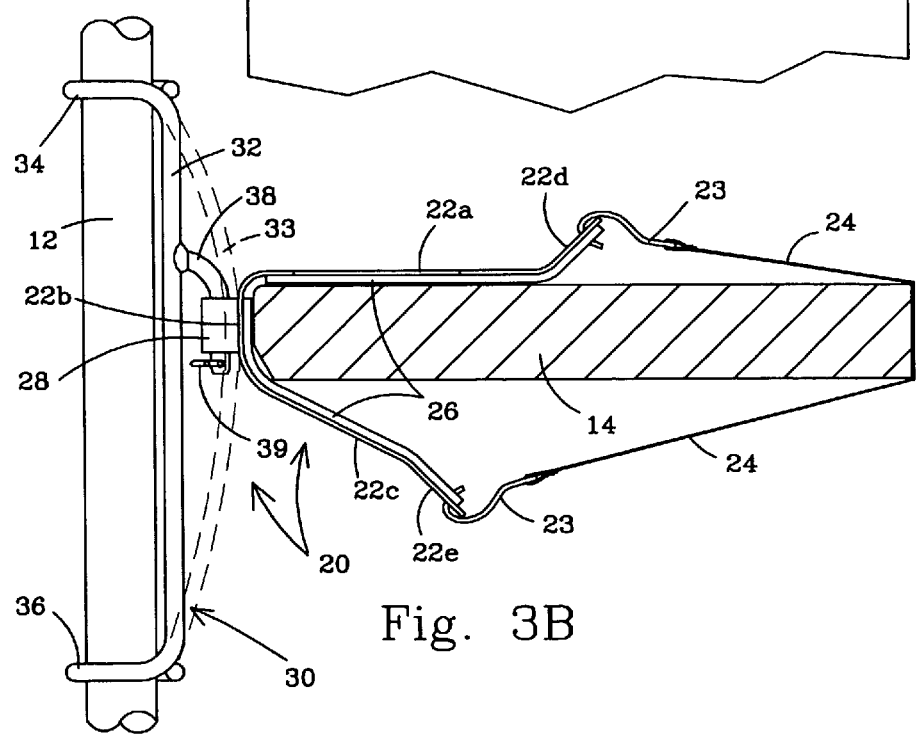
FIG. 3B is a side elevation view of the support device attached to the tail gate of FIG. 3A.

Support device 20 is illustrated in more detail in FIGS. 3A and 3B for the embodiment being tailgate 14 of the vehicle. The main components of the support device include a bent plate support 22, an umbrella pole support 30 and a retainer strap 24. The umbrella pole support is connected to the bent plate support using a support collar 28 affixed to the bent plate support. The umbrella pole support includes a connector arm 38 affixed to a vertical rod 32 that is inserted in the support collar and held in place by a connector arm retainer 39. Alternately, the umbrella pole support can be a curved rod 33 welded directly to the bent plate support within the scope of this invention. The umbrella pole support further includes a top eyelet 34 and a bottom eyelet 36 built integrally with the vertical rod. Umbrella pole 12 is placed through the top and bottom eyelets to hold the umbrella pole in a generally vertical position. The bent plate support is preferably made of metal where the umbrella pole support is preferably made of a heavy wire gauge or bent rods coated with a plastic material. The retainer strap is preferably made of a woven plastic material.

Bent plate support 22 is integrally formed to provide a main contact portion 22a, an end portion 22b and bottom portion 22c. The bent plate support fits around tailgate 14 so that the bent plate support can be attached to and supported by the tailgate. A contact cushion 26 is placed between bent plate support portions 22a, 22b and 22c and tailgate 14 to protect the tailgate from being damaged by the bent plate support. Generally speaking, the bent plate support is coated or lined with rubber or to protect the object from being scratched. The contact cushion is preferably made of a sponge rubber or felt material. Support collar 28 is affixed to the end portion of the bent plate support for this tailgate attachment embodiment. A first retainer portion 22d of the bent plate support is made integrally with main contact portion 22a, and a second retainer portion 22e is made integrally with the bottom portion and provide apertures for using a retainer strap 24 to attach the bent plate support to the tailgate object. A retainer hook 23 connected at each end of the retainer strap is placed in a respective aperture 23a of first and second retainer portions 22d and 22e. Alternately, there can be two retainer straps with each extending to different component of the vehicle, such as a standard hitch receiver (not shown). The retainer strap or straps can also include ratchet devices within the scope of this invention to tighten the straps and better secure support device 20 to the object supporting the support device.

Figure 4:
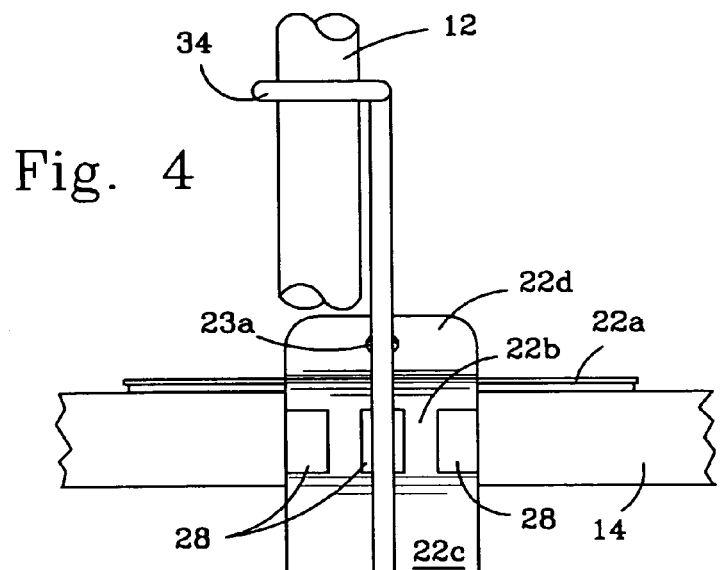
FIG. 4 is a front elevation view of the support device attached to the tail gate of FIG. 3A.

An elevation view of support device 20 is shown in FIG. 4. A portion of umbrella pole 12 between top and bottom eyelets 34 and 36 has been removed so that the location of bent plate support 22 can be observed. Vertical rod 32 is formed integrally with the eyelets. Three support collars 28 are shown affixed to end portion 22b of the bent plate support. Either one of the support collars can be used to connect umbrella pole support 30 to the bent plate support. Main contact portion 22a rests on the top of the tailgate and bottom portion 22c extends below the tailgate. First and second retainer portions 22d and 22e have apertures 23a for receiving the retainer hooks interconnected by the retainer strap to hold the bent plate support in position attached to tailgate 12.

Figure 5A:
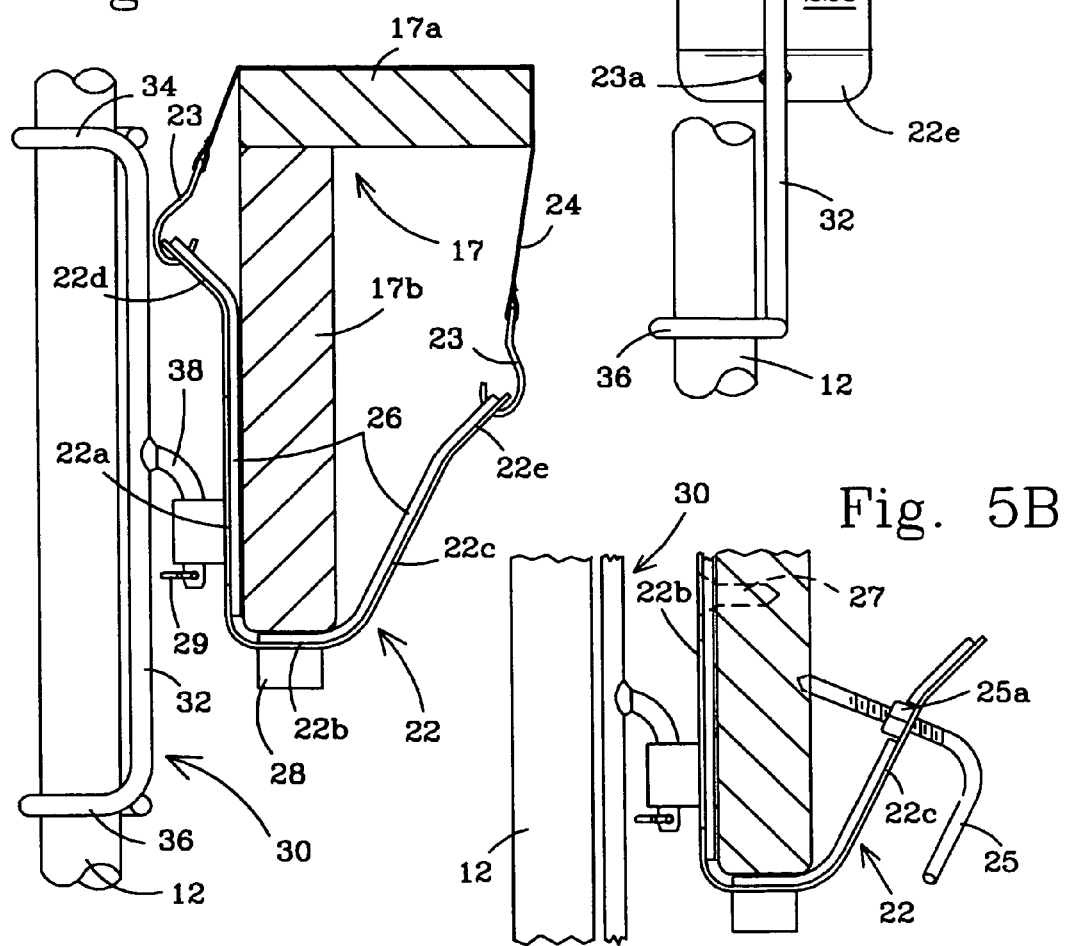
FIG. 5A is a side elevation view of the support device attached to a top rail of a residential wood deck having a bent plate support, a support collar, an umbrella pole support connected to the support collar and a retainer strap.

Details of the use of bent plate support 22 for the second embodiment of FIG. 2 is shown in FIG. 5A. Once again, the object used for attaching the support device is top rail 17 of the deck. The top rail shown has a top member 17a and a vertical member 17b. For this configuration the bent plate support is used in a vertical position to wrap around the vertical member of the top rail. Another support collar 29 is added to main contact portion 22a of the bent plate support to receive connector arm 38 of umbrella pole support 30 and maintain the umbrella pole support in a vertical position. Support collars 28 can remain affixed to the bent plate support without affecting its use. The same umbrella pole support 30 is used as in the first embodiment illustrated in FIG. 3A, including vertical rod 32 with top eyelet 34 and bottom eyelet 36 supporting the umbrella pole 12.

Figure 5B:
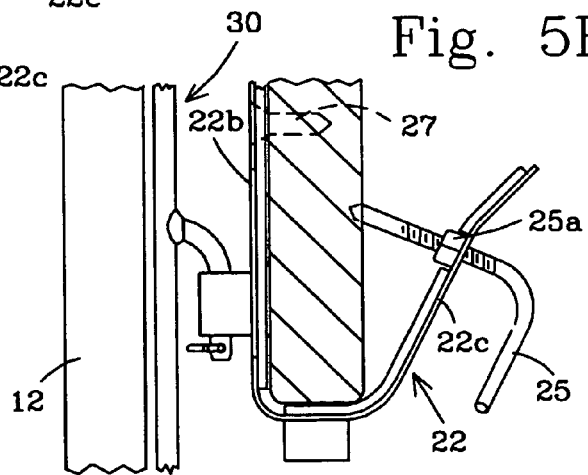
FIG. 5B is a side elevation view of an alternate attachment means having a screw and a threaded rod.

The same retainer strap 24 with hooks 23 can also be used with this second embodiment of FIG. 5A. Another aspect of this second embodiment allows the bent plate support to be directly attached to vertical member 17b of top rail 17, as illustrated in FIG. 5B. A positive attachment to the top rail can be realized by providing a screw fastener 27 through main contact portion 22a of the bent plate support into the vertical member of the top rail. A through bolt with a nut can also be used for providing this positive attachment. In addition, a threaded and bent rod 25 with a nut 25a can be added to bottom portion 22c of the bent plate support. The threaded rod is adjustable to contact the vertical member and help hold the bent plate support attached to the top rail.

The serving trays of this invention are now discussed in more detail. Rectangular serving tray 40 is illustrated in detail in the plan view of FIG. 6A, the side elevation view of FIG. 6B and the front elevation view of FIG. 6C. The rectangular serving-tray is made from an assembly of circular members interconnected together. Preferably the members are straight and bent metal wires or rods welded together and coated with a plastic coating to prevent dirt and corrosion from being a problem. Alternately, the rectangular serving tray can be made of a stainless steel, a corrosive resistant steel alloy or formed as a unit from a plastic sheet. Preferably the rectangular serving tray comprises a food tray 42 and a drink holder 44. The members are formed so that the rectangular serving tray can be place on umbrella pole 12 and held on the umbrella pole by the weight of the rectangular serving tray itself. A first support arm 46 formed from the upper members of the drink holder combine with second support arms 48 formed from the lower members of the drink holder to support the rectangular serving tray. The rectangular serving tray is held on the umbrella pole by friction without the need for additional fasteners or any special protrusions or indentations in umbrella pole 12.

Circular serving tray 60 is illustrated in detail in the plan view of FIG. 7A, the side elevation view of FIG. 7B and the front elevation view of FIG. 7C. The circular serving tray is also made from an assembly of circular members interconnected together. Preferably the members are straight and bent metal wires or rods welded together and coated with a plastic coating to prevent dirt and corrosion from being a problem. Alternately, the circular serving tray can be made of a stainless steel, a corrosive resistant steel alloy or formed as a unit from a plastic sheet. Preferably the circular serving tray comprises a circular food tray 62 and a circular drink holder 64. The members are formed so that the circular serving tray can be place on umbrella pole 12 and held on the umbrella pole by the weight of the circular serving tray itself. An upper support arm 66 formed as an extension of the upper members of the circular drink holder combine with lower support arms 68 formed from the lower members of the circular drink holder to support the circular serving tray. The circular serving tray is held on the umbrella pole by friction without the need for additional fasteners or any special protrusions or indentations in umbrella pole 12.

Serving trays 40 and 60 can be configured to place drink holders 44 and 64 in an alternate location within the scope of this invention. In one alternate location the drink holders are placed in the center of food trays 42 and 62 respectfully. In a second alternate location the drink holders are placed at the edge of the food trays opposite the location of the umbrella pole. For the first and second alternate locations support arms 46, 48, 66 and 68 are made as extensions of the members of the food trays.

Figure 8A:
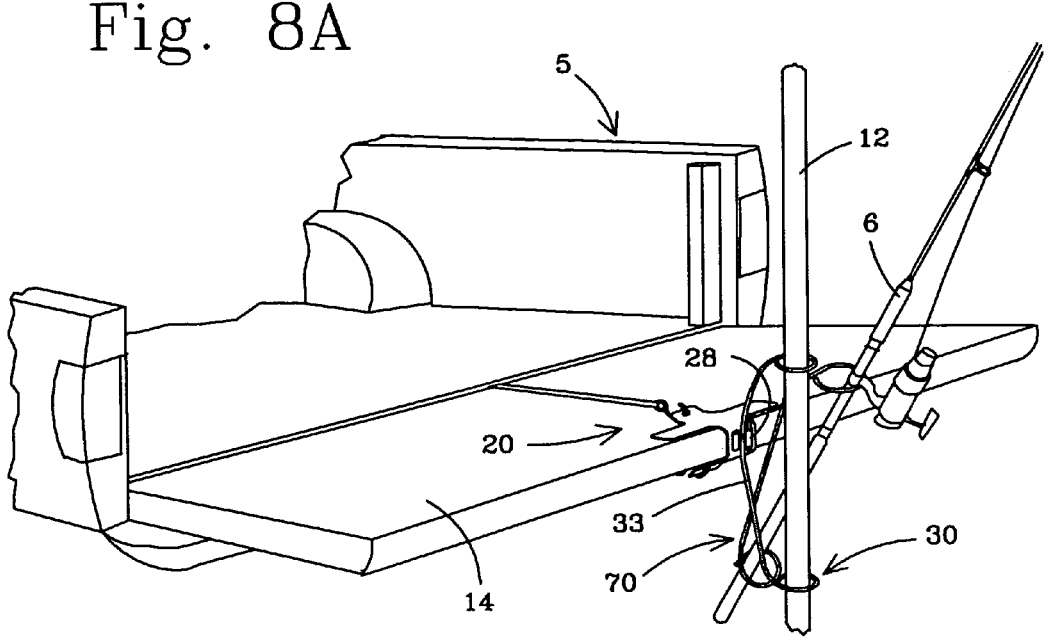
FIG. 8A is a perspective view at the rear of a vehicle showing a fishing pole being held by a fishing pole holder supported by one of the support collars of the support device of this invention attached to the vehicle tailgate.
Figure 8B:
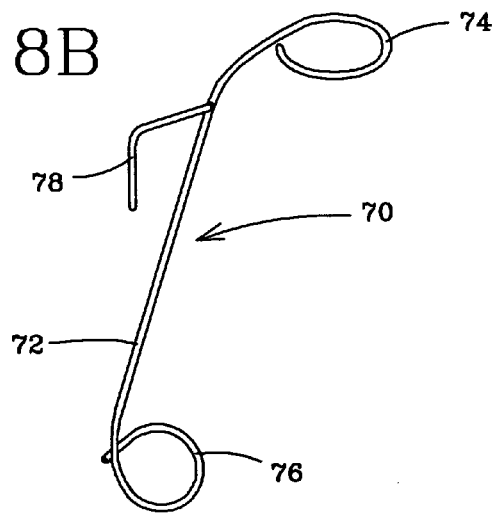
FIG. 8B is a perspective view of the fishing pole holder of FIG. 8A.

Additional accessories and applications are also realized within the scope of this invention. With the umbrella supported by umbrella pole 12 at the rear of vehicle 5 by support device 20, a fisherman can park the vehicle at the edge of a body of water and fish. A sun screen is provided by the umbrella (not shown) and tailgate 14 provides a seat for the fisherman, as illustrated in FIG. 8A. Umbrella pole support 30 is shown to have a curved rod 33 in this application. The support device of this invention includes additional support collars 28 (see FIG. 3A) which can be used to support a fishing pole holder 70 for a fishing pole 6. The fishing pole holder carries the fishing pole to assist the fisherman from having to hold the fishing pole. Details of the fishing pole holder are illustrated in FIG. 8B. The fishing pole holder is formed with a top loop 74 and a bottom loop 76 formed integrally with a holder rod 72. A holder connector arm 78 is placed in support collar 28 of support device 20 so that the fishing pole holder can carry the fishing pole without assistance from the fisherman.

Figure 9A:
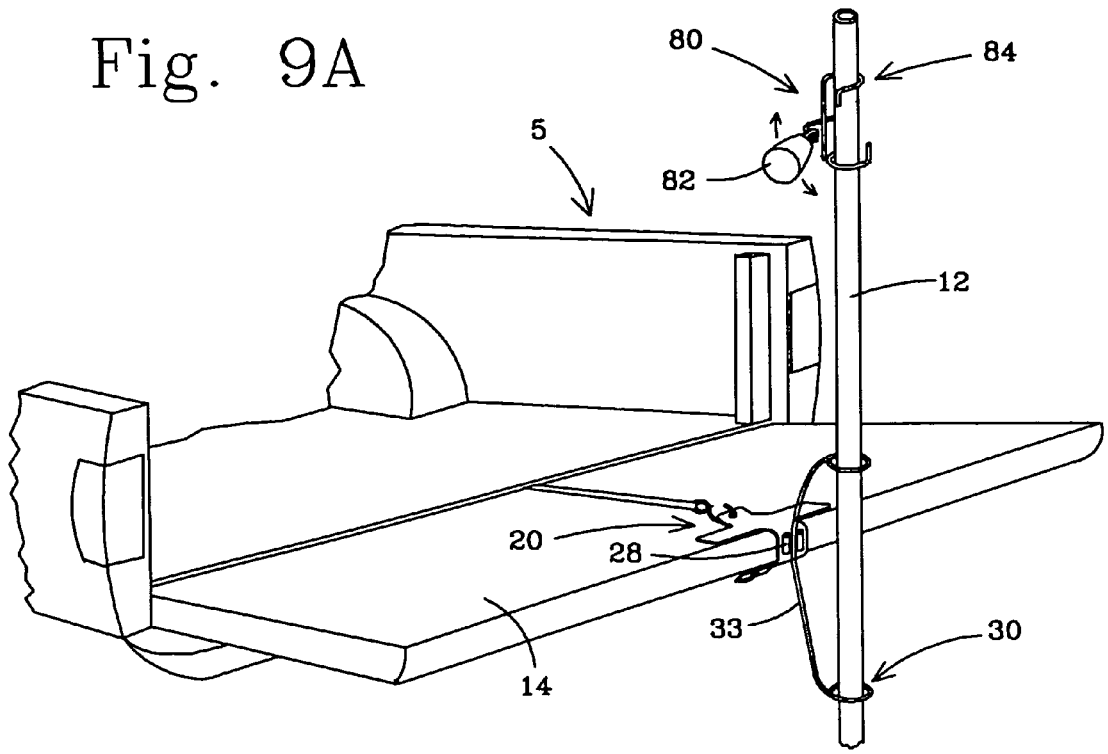
FIG. 9A is a perspective view of a light holder being supported by the umbrella pole which is supported by one of the support collars of the support device of this invention attached to the tailgate of a vehicle.
Figure 9B:
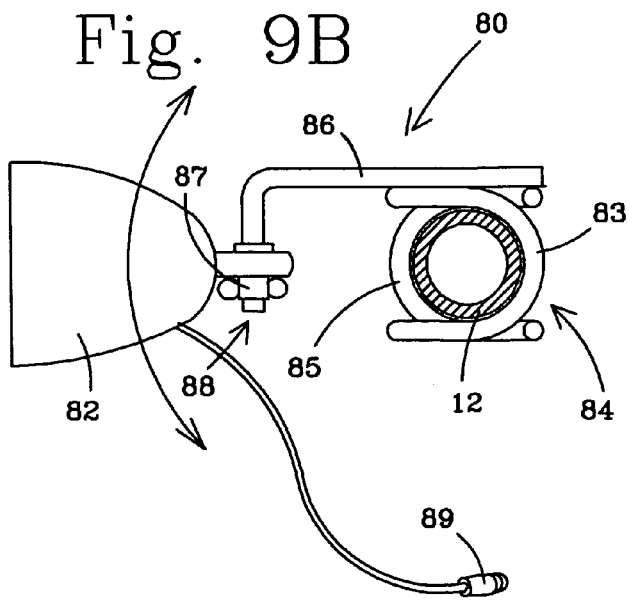
FIG. 9B is a plan view of the light being supported by a light support carried by the umbrella pole so that the light can be rotated about the umbrella pole.

Another accessory realized within the scope of this invention is the addition of a light assembly 80 supported by the umbrella pole at the rear of vehicle 5. Some sporting activities where tailgating is commonly practiced continue after dark. The light assembly can be used for these and other activities. Possibly the umbrella pole alone is all that is necessary after dark. Umbrella pole 12 connected to tailgate 14 using support device 20, with umbrella pole support 30, is an excellent support for the light assembly, as illustrated in FIG. 9A. Details of the light assembly are illustrated in FIG. 9B. The light assembly includes a light 82 and a light support 84. The light is preferably a twelve volt white light with a standard trailer hookup plug 89. The light support has a top hook 83 and a bottom hook 85 that are connected together to hold the light assembly on the umbrella pole. The light support also includes a pivot arm 86 that extends to form a pivot connector 88 with the light. A winged nut 87 allows the direction of the light to be adjusted vertically up and down around the pivot arm. Moving the light support around umbrella pole 12 allows the direction of the light to be adjusted laterally.

Figure 10:
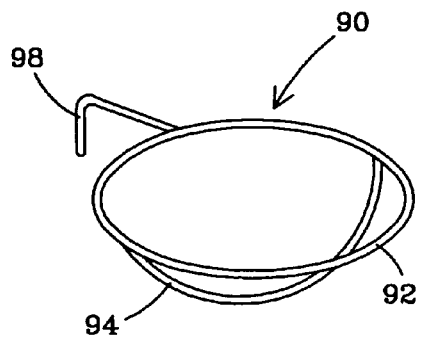
FIG. 10 is a perspective view of a bowl holder with a bowl connector arm for placement in one of the support collars of the support device.

A further accessory easily made to use another one of the support collars of support device 20 is the bowl holder 90, illustrated in FIG. 10. A bowl connector arm 98 is made to fit into support collar 28 and support the bowl holder. The bowl holder has a circular top ring 92 and a support ring 94 to support a standard cereal bowl. This accessory is a companion to the serving trays disclosed and discussed above for eating or having snacks.

While a preferred embodiment of the invention has been described using specific terms and a particular prior art reference, such description is for illustrative purposes only, and it is to be understood that changes and variations may be made without departing from the spirit or scope of the following claims.

What is claimed is:

1. A combination sun screen and user serving assembly comprising:
    an umbrella supported by an umbrella pole;
    a support device attached to an object for holding said umbrella pole in a generally vertical position to shade at least a portion of said object and the user from the sun;
    at least one serving tray held and supported by said umbrella pole to serve the needs of the user in the shade of the umbrella; and
    said support device having:
    a bent plate support in contact with and connected to said object;
    at least one retainer strap with a hook at each end for holding said bent plate in contact with said object;
    an umbrella pole support connected to said bent plate support to receive and held hold said umbrella pole; and
    at least one support collar affixed to said bent plate support to receive said umbrella pole support.

2. The assembly of claim 1 wherein said object is a vehicle having a tailgate.

3. The assembly of claim 1 wherein said object is a deck having a top rail.

4. The assembly of claim 1 wherein said bent plate support includes:
    an end portion made integrally with both a main contact portion and a bottom portion;
    a first retainer portion made integrally with said main contact portion; and
    a second retainer portion made integrally with said bottom portion.

5. The assembly of claim 4 wherein said first and second retainer portions each have an aperture to receive a respective hook of said retainer strap.

6. The assembly of claim 1 wherein said umbrella pole support includes:
    a vertical rod extending generally parallel with and adjacent to said umbrella pole;
    a connector arm affixed to said vertical rod for connecting said vertical rod to said at least one support collar of said bent plate support; and
    top and bottom eyelets made integrally with said vertical rod to receive and support said umbrella pole.

7. The assembly of claim 6 wherein said bent plate support carries a second support collar to receive a fishing pole holder and a third support collar to receive a fishing pole holder.

8. The assembly of claim 1 wherein said bent plate support includes:
    an end portion made integrally with a main contact portion and a bottom portion;
    an aperture in said top plate to receive a screw fastener for attachment of said bent plate support to said object; and a threaded rod extending through a nut welded to said bottom portion, said threaded rod being adjustable in length to contact said object and help hold said bent plate attached to said object.

9. The assembly of claim 1 wherein said at least one serving tray includes:
- a rectangular-shaped food tray for supporting food products and the like;
- a rectangular-shaped drink holder made integrally with said food tray;
- a first support arm made integrally with said drink holder; and
- a pair of second support arms extending from said drink holder, wherein said first and second support arms contact said umbrella pole to support and hold said serving tray connected to said umbrella pole.

10. The assembly of claim 9 wherein said rectangular-shaped food tray and said drink holder are made of metal rods welded together and coated with a plastic coating.

11. The assembly of claim 9 wherein said rectangular-shaped food tray and drink holder are made of a plastic material molded together as a unit.

12. The assembly of claim 1 wherein said at least one serving tray includes:
- a circular-shaped food tray for supporting food products and the like;
- a circular-shaped drink holder extending from and made integrally with said food tray;
- an upper support arm extending from said circular-shaped drink holder to partially encircle said umbrella pole; and
- a pair of lower support arms extending from said circular-shaped drink holder, wherein said upper and lower support arms contact said umbrella pole to support and hold said serving tray connected to said umbrella pole.

13. The assembly of claim 12 wherein said circular-shaped food tray and drink holder are made of metal rods welded together and coated with a plastic material.

14. The assembly of claim 12 wherein said circular-shaped food tray and drink holder are made of a plastic material molded together as a unit.

15. The assembly of claim 1 including a contact cushion placed between said bent plate support and said object to protect said object from damage.

16. A support device associated with an object is provided for holding an umbrella with an umbrella pole supporting at least one serving tray to provide shade from the sun for a user occupying a portion of the object and using the serving tray, said support device comprises:
- a bent plate support in contact with and connected to said object;
- at least one retainer strap with a hook at each end for holding said bent plate support in contact with said object;
  - an umbrella pole support connected to said bent plate support to receive and help hold said umbrella pole including a vertical rod extending generally parallel with and adjacent to the umbrella pole, a connector arm affixed to said vertical rod for connecting said vertical rod to said bent plate and top and bottom eyelets made integrally with said vertical rod for receiving and supporting said umbrella pole; and
- at least one support collar welded to said bent plate support to receive and support said umbrella pole support.

17. The device of claim 16 wherein said bent plate support includes:
- an end portion made integrally with both a main contact portion and a bottom portion;
- a first retainer portion made integrally with said main contact portion; and
- a second retainer portion made integrally with said bottom portion, wherein said first and second retainer portions each have an aperture to receive a respective hook of said at least one retainer strap.

18. The device of claim 17 including:
a light assembly carried by the umbrella pole;
a fishing pole holder attached to a second support collar of said bent plate support; and
a telescoping umbrella pole.

* * * * *